United States Patent [19]

Meuschke

[11] Patent Number: 4,659,068

[45] Date of Patent: Apr. 21, 1987

[54] ICE BASKET CRUCIFORM REMOVAL TOOL

[75] Inventor: Robert E. Meuschke, Penn Hills Township, Allegheny County, Pa.

[73] Assignee: Westinghouse Electric Corp., Pittsburgh, Pa.

[21] Appl. No.: 868,894

[22] Filed: May 27, 1986

Related U.S. Application Data

[63] Continuation of Ser. No. 732,123, May 8, 1985, abandoned.

[51] Int. Cl.⁴ .............................................. B23K 7/04
[52] U.S. Cl. ...................................................... 266/55
[58] Field of Search ...................................... 266/48, 55

[56] References Cited

U.S. PATENT DOCUMENTS 4,162,383 7/1979 Hamasaki ............................... 266/55

FOREIGN PATENT DOCUMENTS 110173 6/1983 Japan ..................................... 266/55

Primary Examiner—Wayland Stallard
Attorney, Agent, or Firm—R. S. Lombard

[57] ABSTRACT

A tool for removing cruciforms from an ice basket having an elongated, generally cylindrical and vertically oriented sidewall, the interior of which is accessible from the upper end thereof. The tool is lowered into the ice basket from the open, upper end thereof in axial alignment with the ice basket. Clamping means disposed at the lower end of the tool are aligned with a cruciform. Remote control means are operable from the exterior of the ice basket to actuate the clamping means for securely clamping the cruciform, for igniting a cutting torch assembly, and for operating a linear actuator to move the cutting torch assembly downwardly in translation, the torches of the cutting torch assembly cutting the cruciform from the ice basket. The cruciform remains clamped, and is withdrawn with the tool from the ice basket.

6 Claims, 10 Drawing Figures

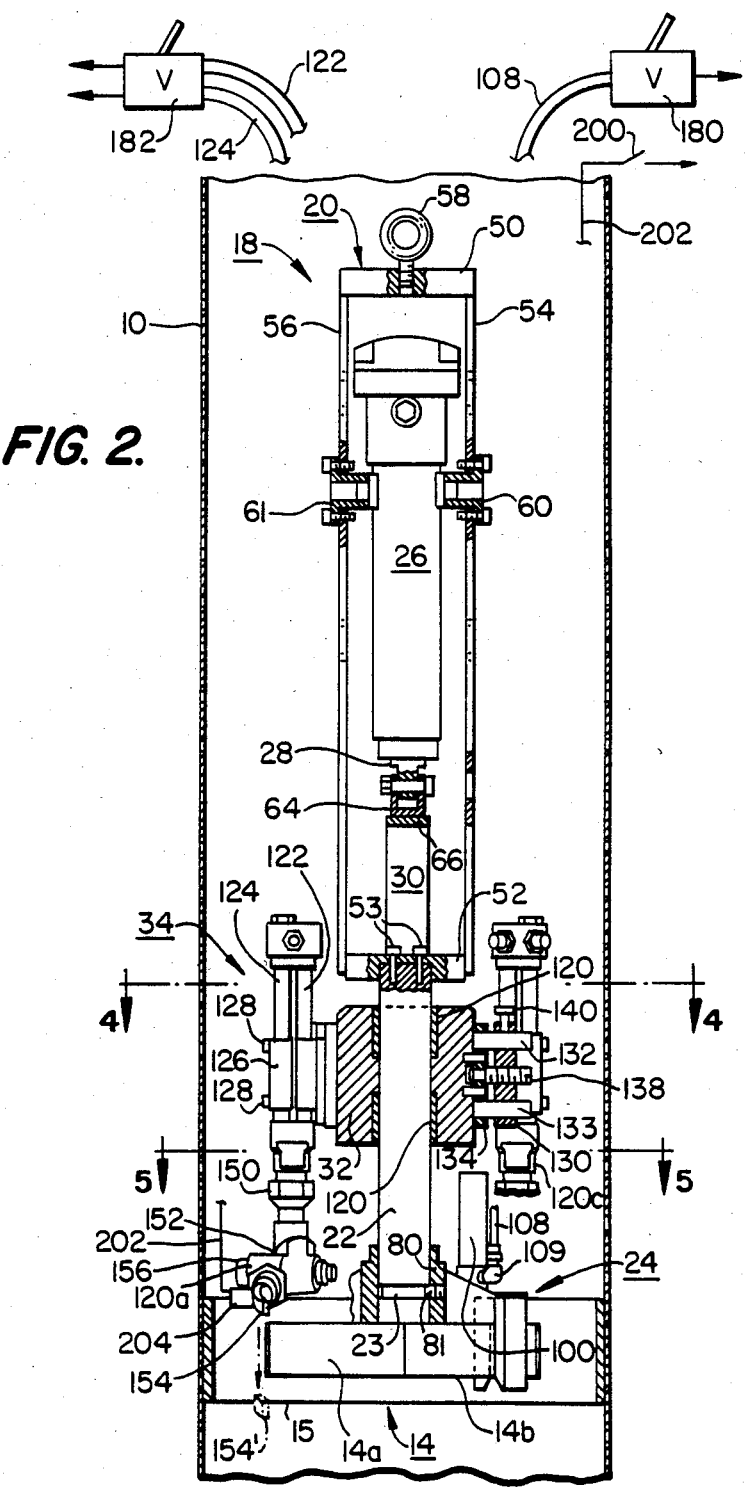

ICE BASKET CRUCIFORM REMOVAL TOOL

This application is a continuation, of application Ser. No. 732,123, filed May 8, 1985, now abandoned.

BACKGROUND OF THE INVENTION

1. Field of the Invention

This invention relates to ice condenser containments employed for condensing steam generated from the primary water of a nuclear reactor in the invent of an accidental loss of coolant and, more particularly, to a method and apparatus for servicing such ice condenser containments to permit replacing ice which has sublimated and thus been lost from within the ice condenser containment.

2. State of the Prior Art

Ice condenser containments, also known as ice baskets, are employed with nuclear reactors for condensing the steam from the primary water of the reactor in the event of an accidental loss of coolant. In a typical installation, there are provided approximately 2,000 ice baskets, each of which is approximately one foot in diameter and 50 feet in height and is filled with approximately 1,500 pounds of ice. The sidewalls of the ice basket, substantially cylindrical in configuration, are perforated to permit rapid exposure of the steam to the ice and corresponding, rapid cooling.

A problem has developed in the use of such ice condenser containments, in that due to sublimation of the ice, the initial volume and weight decreases with time and thus the ice must be replenished, or replaced. A minimum required amount of ice is typically at least 1,200 pounds for each ice basket, for assuring its effectiveness for counteracting the accidental loss of coolant, as above referenced.

FIG. 1 is an elevational cross-sectional view of an individual ice basket 10; as before noted, the ice basket 10 is of generally cylindrical configuration, approximately 50 feet in height and approximately one foot in diameter. Cruciforms 14 are positioned at approximately six foot height spacings along the axial height of the basket 10 and comprise metal straps approximately $\frac{1}{4}$ inch thick and typically 1$\frac{1}{2}$ inches in height extending diametrically across the interior of the basket 10 and welded at the ends thereof to the interior sidewalls of the basket 10. Typically, each cruciform comprises two such diametrically extending straps suitably, integrally joined at the intersections thereof along the axis of the basket 10, and thus in an "X"-shaped configuration. The cruciforms were intially provided to afford increased lateral support for the ice basket 10 as a precaution against severe seismic disturbances; it has been determined that such welded-in-place cruciforms are not necessary to maintaining adequate lateral support and that alternative structures instead may be employed.

The cruciforms, however, have imposed a substantial obstacle to replenishing the supply of ice, as the latter is depleted due to sublimation. For example, as seen in FIG. 1, the successively lower compartments contain inadequate charges of ice due to sublimation loss, and remain spaced apart due to the presence of cruciforms 14. Thus, while access may be had to the upper, open end of the ice basket 10 for recharging the first and possibly the second upper compartments, the lower compartments are inaccessible and contain an inadequate charge of ice. The ice basket thus loses its required cooling capability, presenting a potentially serious deficiency in its required coolant capacity.

SUMMARY OF THE INVENTION

The present invention addresses the problem of servicing ice baskets in which the charges of ice have become depleted due to sublimation. Particularly, due to the closely adjacent stacking of the ice baskets 10 and the extremely large number thereof, for example, approximately 2,000 ice baskets for a given nuclear reactor, access to the interior of an individual ice basket 10 is restricted essentially to its upper, open end. As noted, it has been determined not to be necessary to employ cruciforms welded in place within the ice basket 10 and instead that alternative structures may be employed. Thus, while it is permissible to remove the cruciforms to gain access to successively lower compartments, it has been determined that it is necessary first to remove the ice from each compartment, in succession, prior to removal of the cruciform associated with each such compartment. Thereafter, the required charge of ice is replenished in the ice basket. The ice removal auger of the present invention permit rapid removal of the remaining, hardened ice from each of the successive compartments, thereby to expose the associated cruciform and permit its ready removal. The present invention thus satisfies the requirement that the ice removal function be performed rapidly, to minimize associated down-time of the nuclear reactor. Whereas various manual techniques may be employed to remove the remaining ice within each chamber thereby to expose the underlying cruciform 14, a highly effective device for performing this function is disclosed in the concurrently filed application entitled ICE REMOVAL AUGER of which the present inventor herein is a co-inventor, and which is assigned to the common assignee herein.

The ice basket cruciform removal tool of the present invention accordingly is lowered into each compartment, subsequently to the removal of any remaining ice therein, for engaging the welded-in-place cruciform and cutting same from the cylindrical sidewall of the ice basket. The tool, with the cruciform still engaged thereby, is removed, thereby affording access to the next successive compartment. The tool comprises, as major components, an upper support, from the lower extremity of which extends a shaft carrying, in turn, at its lower extremity, a cruciform guide and clamp assembly which, when lowered into the basket, serves to clamp firmly a cruciform to be removed. A linear actuator is mounted within the upper support and operates through appropriate linkage to move a mounting block in translation along the shaft. The mounting block carries a cutting torch assembly comprising cutting torches pre-aligned with corresponding elements of the cruciform. Once in position, the cutting torches are ignited, at a low oxygen flow, to preheat the corresponding cruciform elements. After a few seconds of preheating, the oxygen feed to the cutting torches is increased to establish cutting flames. The linear actuator then drives the cutting torch assembly downwardly at a predetermined speed correlated with the cutting rate of the torches with respect to a given cruciform structure, through a predetermined distance of travel sufficient to assure that the cruciform is cut completely from the sidewalls of the ice basket. Thereafter, the cruciform removal tool is withdrawn from within the ice basket, the cruciform guide and clamp assembly continuing to clamp the cruciform which has just been cut free for removal of same from the ice basket.

The cruciform removal tool of the invention provides for remote actuation of the guide and clamp assembly and remote ignition of the cutting torches as well as remote energization of the liner actuator, thereby to facilitate the removal of the successive cruciforms throughout the entire height of each ice basket. The cruciform removal tool thus accomplishes in an efficient and highly effective manner a task which heretofore has been arduous and time consuming, minimizing both the time required to perform the servicing, and, significantly, the down time of a nuclear reactor requiring such servicing.

BRIEF DESCRIPTION OF THE DRAWINGS

FIG. 2 is a front elevational view of a cruciform removal tool in accordance with the present invention;

FIG. 6b is a bottom plan view of the portion of the apparatus shown in FIG. 6a;

DETAILED DESCRIPTION OF THE PREFERRED EMBODIMENT

Figure 1:
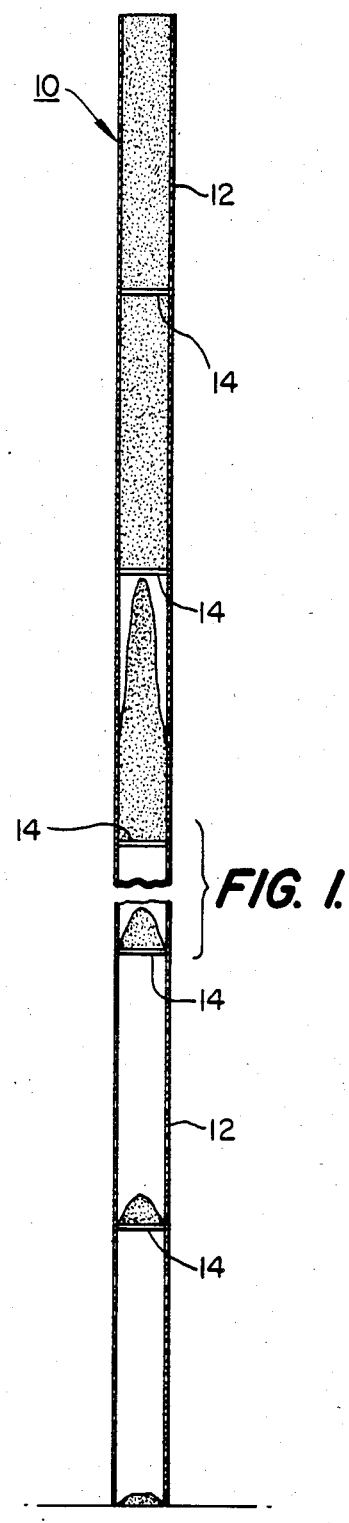
FIG. 1 is a schematic, elevational view of an ice basket of the type employed in the prior art.

The cruciform removal tool 18 of the invention is shown in the front elevational view of FIG. 2 as disposed within an ice basket 10 in generally coaxial relationship therewith and engaging a cruciform 14, in preparation for performing a cutting operation for removal of same. The cruciform removal tool 18 includes, as major components, an upper support bracket 20 having a generally open, rectangular configuration, and which supports from its bottom extremity a shaft 22 which, at its lower extremity, supports a cruciform guide and clamp assembly 24, the latter being shown in more detail in FIGS. 5, 6 and 7. A linear actuator 26 is mounted within the upper support bracket 20 and extends in axially aligned relationship therewith; the actuating arm 28 of the linear actuator 26 is connected at its lower extremity to a lower bracket 30, of generally U-shaped configuration, which is oriented at a 90° displacement relative to the upper support bracket 20 about the common, aligned axes thereof and is mounted in interdigitized, sliding relationship therewith. The lower bracket 30 is secured at its lower extremity to a mounting block 32 which supports a cutting torch assembly 34, the latter being shown in more detail in FIG. 4. The cruciform removal tool 18 of the invention is shown in a configuration as actually employed for removing cruciforms of generally "X"-shaped configuration, as before described, and thus having four, 90°-displaced, radially extending straps. Thus, the tool 18 comprises four duplicated components, in a corresponding configuration, for each of the guide and clamp assembly 24 and the cutting torch assembly 34. However, for ease of illustration in the drawings hereof, there is shown in detail primarily only a single one of each of the four duplicated components of the respective assemblies 24 and 34. It will be appreciated, moreover, that by suitable reconfiguration of the support elements of the respective assemblies 24 and 34, as hereinafter described in greater detail, the cruciform removal tool 18 of the invention readily may be adapted to other types or configurations of cruciforms, for example, cruciforms having different numbers of radial straps and/or different angular separations therebetween. Thus, the herein disclosed embodiment of the cruciform removal tool 18 of the invention, which serves for removal of a cruciform 14 having quadrature-related radial straps, is not to be deemed limiting, but merely illustrative.

Figure 3:
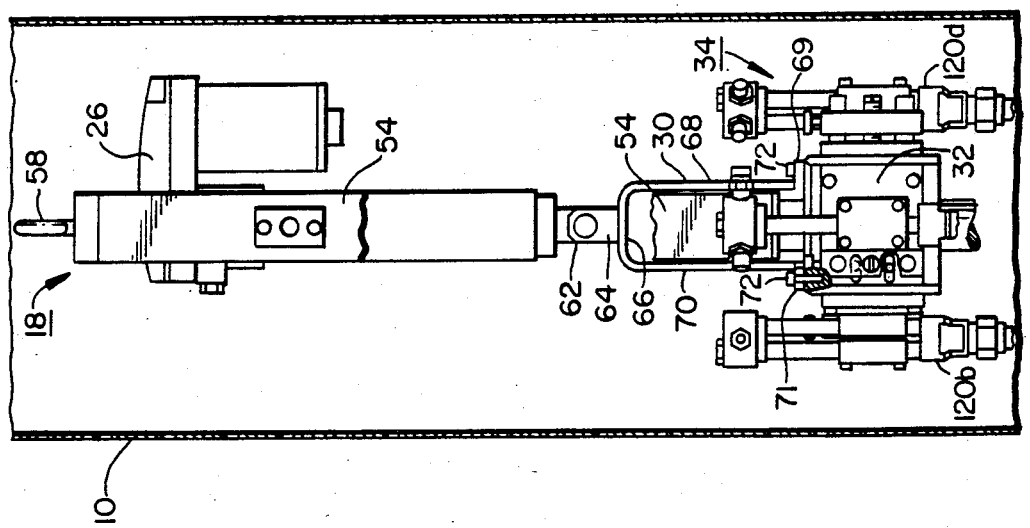
FIG. 3 is a side elevational view of a portion of the cruciform removal tool of the present invention for illustrating, particularly, the linear actuator and associated linkage and support elements for the cutting torch assembly and its associated mounting block by which the linear actuator moves same in controlled translation during the cutting operation.

In more detail, and with reference to the foregoing figures, the upper support bracket 20 includes top and bottom support plates 50 and 52 and longitudinally extending sidewalls 54 and 56, the latter being broken away in FIG. 3 for ease of illustration. A ring 58 is secured to the upper support plate 50 of the upper bracket 20 by which the cruciform removal tool 18 may be connected to a winch (not shown) for facilitating its being lowered into or withdrawn from the ice basket 10. The lower support plate 52 is machined to include a circular recess therein into which the upper end of shaft 22 is received and then secured by suitable means, for example, the screws 53.

The linear actuator 26 is secured to the sidewalls 54 and 56 of the upper support bracket 20 by conventional trunion mounts 60 and 61. The actuating arm 28 of the linear actuator 26 is connected through a coupling 62 to a clevis 64 secured to the cross-leg 66 of a lower bracket 30 of U-shaped configuration, the depending side legs 68 and 70 of which extend beyond the lower support plate 52 of the upper support bracket 20 and are secured to the mounting block 32. Particularly, the respective depending legs 68 and 70 include lateral flanges 69 and 71 which are apertured to receive therethrough suitable mounting screws, as shown at 72 in FIG. 3, for securing the U-shaped lower bracket 30 to the mounting block 32. Preferably, the lower support plate 52 of the upper support bracket 20 includes corresponding recesses for receiving the side legs 68 and 70 of the U-shaped lower bracket 30 in sliding engagement therein, for alignment purposes. As before noted, the mounting block 32 is received in sliding engagement on the shaft 22.

The front elevational view of FIG. 2 illustrates two of the four quadrant-related, radially extending straps of the X-shaped cruciform 14, and which are more particularly designated 14a and 14b in FIG. 2. As seen in more detail in FIG. 2, as well, the cruciform 14 further may comprise an annular band 15 which is contiguous at its outer circumference with the interior surface of the generally cylindrical sidewall of the ice basket 10 and is secured thereto such as by welding. The straps 14a and 14b in turn are secured at their radially outward ends to the interior surface of the band 15, such as by welding, the interior, contiguous ends of the straps 14a and 14b disposed at the central axis of the ice basket 10 as well being integrally joined such as by welding. The two remaining straps 14a and 14b, shown in FIGS. 4 and 5 but not in FIG. 2, are similarly secured in position.

In the position of the cruciform removal tool 18 shown in FIG. 2, the cruciform guide and clamp assembly 24 is positioned in alignment with, and engaging, the straps 14a and 14b of the cruciform 14. More particularly, and with concurrent reference to FIGS. 2, 5, 6a, 6b and 7, the cruciform guide and clamp assembly 24 comprises a hub 80 which is received on the lower extremity of the shaft 22, the latter including an annular groove, or key, 23 for receiving a set screw 81 which extends radially and in threaded engagement through the hub 80, thereby to secure the elements together.

Figure 5:
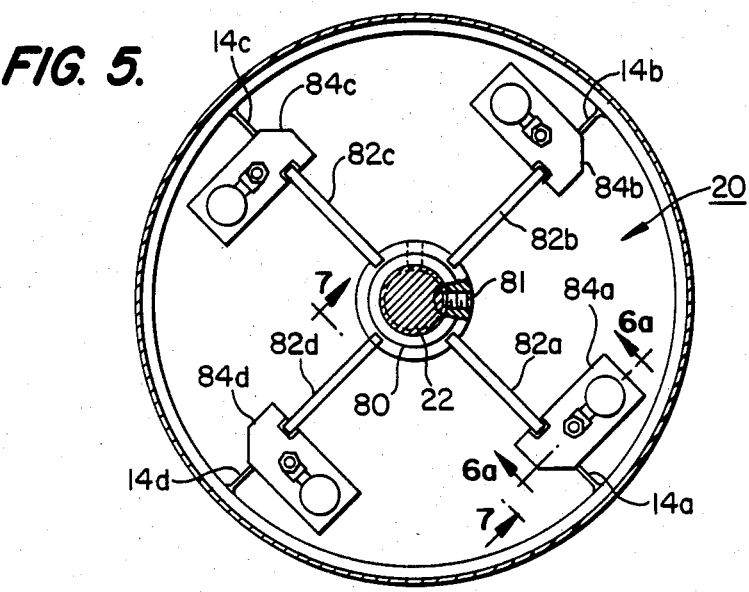
FIG. 5 is a cross-sectional view taken along the line 5—5 in FIG. 2, illustrating certain details of the cruciform guide and clamp assembly.
Figure 6A:
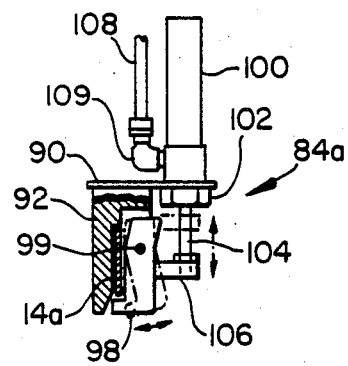
FIG. 6a is an elevational view taken along line 6a—6a in FIG. 5.
Figure 7:
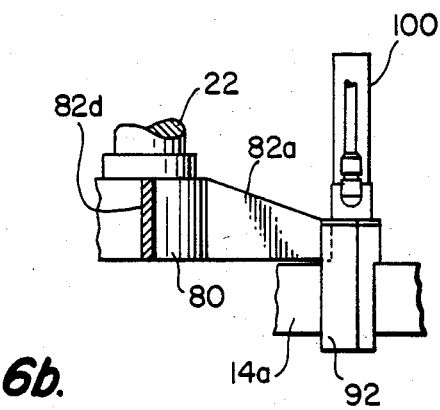
FIG. 7 is a side-elevational view taken along the line 7—7 in FIG. 5.
Figure 6B:
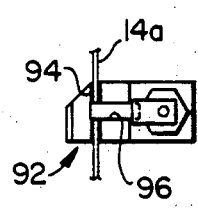

With more specific reference to FIGS. 5, 6a, 6b, and 7, and assuming a cruciform having four quadrature related straps 14a through 14d, the cruciform guide and clamp assembly 24 includes, correspondingly, four clamp supports 82a through 82d and respectively associated clamps 84a through 84d. Since each of the latter is identical in configuration, only a single one thereof is described in more detail, with particular reference to FIGS. 6a, 6b and 7 in which details of the clamp 84a are shown. Particularly, FIG. 6a is a view along the line 6a—6a in FIG. 5 illustrating, in partial cross-section, certain details of the clamp 84a. Likewise, FIG. 7 is a view taken along the line 7—7 in FIG. 5 and thus comprises an elevational view perpendicular to that of FIG. 6a. FIG. 6b is a bottom plan view of the structure illustrated in FIG. 6a. The clamp 84a comprises a generally horizontal plate 90 secured to a clamping block 92 which, as best seen in the bottom plan view of FIG. 6b, is machined to define a channel 94 for receiving the corresponding strap 14a of the cruciform 14. The clamping block 92 further is machined to form a transverse channel 96 thereby to create a clevis in which a lever 98 is pivotally supported, as indicated at 99. An air cylinder 100 is supported on plate 90 and secured thereto by nut 102, the actuating arm 104 extending axially downwardly therefrom and carrying on its outer extremity an actuator 106 which engages the adjacent cam surface of the lever 98. Pressurized air is supplied to the air cylinder 100 through suitable means, illustrated as a conventional elbow 109 and tubing 108 which extends to the top of the cruciform removal tool 18 for connection to an external supply. In FIGS. 6a and 6b, the air cylinder 100 is shown in its deactuated condition to which it is normally biased such as by conventional springs (not shown). Particularly, the actuating arm 104 is extended so as to engage actuator 106 against the lower cam surface of lever 98 and pivot same to its solid line position, thereby clamping the strap 14a of the cruciform 14 within the channel 94. When the air cylinder 100 is actuated, the actuator arm 104 and the associated actuator 106 are withdrawn to the respective dotted line positions, causing the lever 98 to pivot to its dotted line position, thereby opening the channel 94 to receive a strap 14a therein. This is the position of lever 98 when the cruciform removed tool 18 is being lowered into aligned position with a cruciform 14 which is to be removed.

Figure 8:
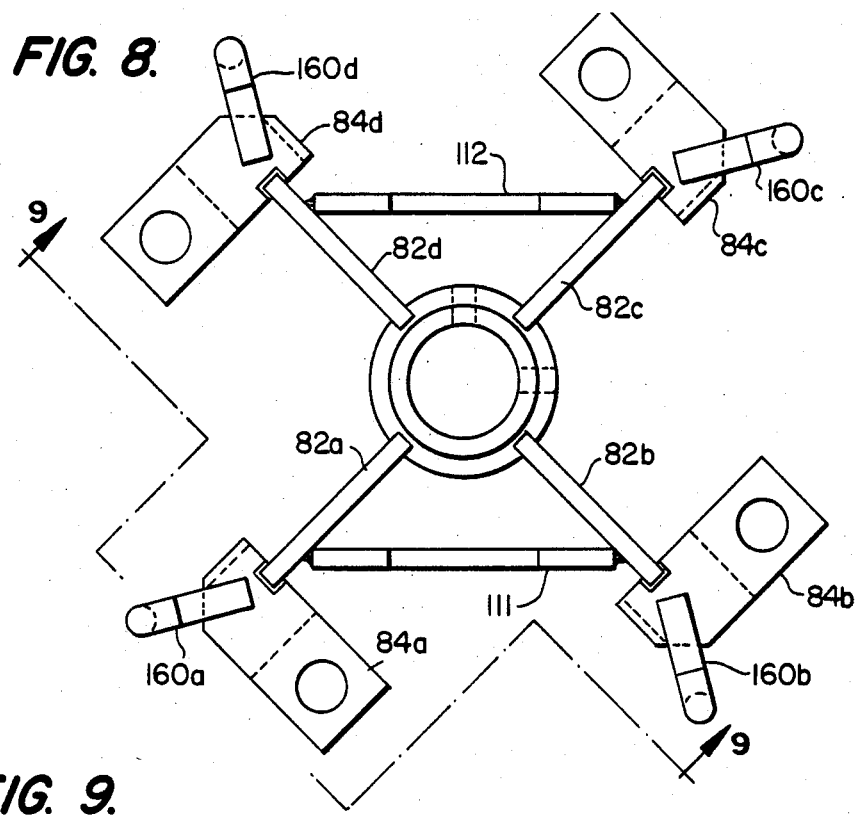
FIG. 8 is a simplified schematic illustration of the cruciform guide and clamp assembly of FIG. 5, showing additional details of a preferred structure thereof.
Figure 9:
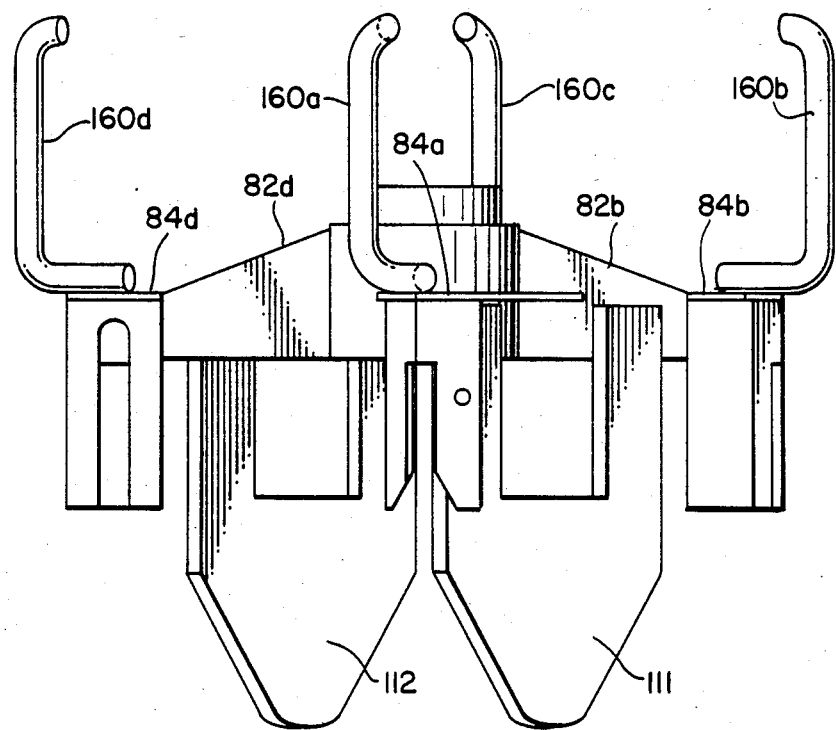
FIG. 9 is an elevational view of the schematically illustrated structure of FIG. 8.

To facilitate that initial alignment function, and with reference to FIGS. 8 and 9 comprising simplified plan and elevational views, respectively, of the guide and clamp assembly 24, there are additionally provided guide plates 111 and 112 secured at their opposite longitudinal edges, such as by welding, to the associated clamp supports 82a, 82b, 82c and 82d. The guides 111 and 112 have not been shown in the preceding figures for enabling clarity of illustration therein, but preferably are employed for their assistance in the guiding function to establish alignment of the channels of the clamping blocks, shown as channel 94 in clamping block 92 in FIG. 6a, with the respectively associated straps of the cruciform 14. Particularly, as seen in FIG. 9, the guides 111 and 112 are contoured at their lower extremities to define a V-shaped configuration, which enters the space between corresponding, adjacent straps of a given cruciform 14 as the cruciform removal tool 18 is inserted downwardly into the ice basket 10 to enage a next successive cruciform 14 to be removed. This assures that the corresponding straps are received in the channels of the associated clamping blocks of the clamps 84a through 84d.

Figure 4:
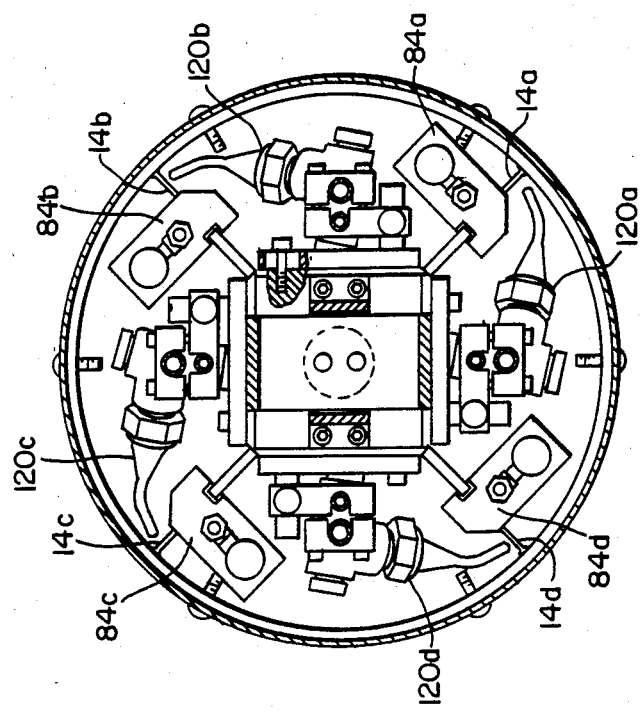
FIG. 4 is a cross-sectional view taken along the line 4—4 in FIG. 2, illustrating details of the cutting torch assembly and its associated mounting block.

With reference to FIGS. 2, 3 and 4, the mounting block 32 includes suitable bearings 120 which enable it to slide freely in translational movement along the shaft 22, under control of the linear actuator 26 operating through the U-shaped bracket 30, the extent of movement of the block 32 being designed to be sufficient to traverse the full height of the straps 14a, 14b, ... of the cruciform 14.

As before noted, the cutting torch assembly 34 comprises a number of individual cutting torches corresponding to the number of straps of a cruciform to be removed, and, for the illustrative example, comprises four torches 120a to 120d, all being identical and conventional. Moreover, each of the torches 120a through 120d is adjustably mounted to the mounting block 32 by identical structures. Thus, there is seen in FIG. 2 the torch 120a and, in broken-away view, a portion of torch 120c; similarly, portions of torches 120b and 120d are seen in FIG. 3.

With particular reference to the torch 120a, suitable gas feed lines 122 and 124, typically of metal, are received through a clamp 126 which is secured to the mounting block 32 in a manner to be described. The clamp 126 includes adjustment screws 128 which may be manipulated to release the tubes 122 and 124 for initial vertical positioning of the associated cutting torch 120a and then tightened so as to maintain that position. Each clamp 126 furthermore is secured to an adjustable clamp 130, better seen in relation to the cutting torch 120c in FIG. 2. Specifically, the clamp 130 is apertured to receive two guide pins 132 and 133 which are secured to a plate 134 which in turn is secured, such as by screws 136, to the mounting block 32. Adjustment screw 138 is fixed within the plate 134 against axial movement but is free to rotate therein, and is received in threaded engagement through the plate 130 thereby to enable radially outward or inward positioning of the associated cutting torch 120c. Once set to the desired radial position, set screw 140 is adjusted to tighten the block 130 to the guide pin 132.

Referring again to the cutting torch 120a, it is connected through a suitable mixing coupler 150 to the gas feed lines 122 and 124, and includes an adjustable elbow 152 permitting pivotal movement of the head 154. When the head is in the desired angular position, clamping screw 156 is tightened thereby to retain the head in that position.

Thus, each of the welding torches 120a through 120d may be independently adjusted to align same into the appropriate position as required for cutting the associated strap of a given cruciform 14. As before noted, as well, the block 32 is mounted for translational movement along shaft 22, under control of the linear actuator 26 operating through the U-shaped bracket 30, for moving the cutting torch assembly 34 axially downwardly, as the cutting progresses, to the dotted line position indicated at 154' in FIG. 2. For straps of 1½ inch vertical height, measured along the longitudinal axis in FIG. 2, an extent of travel of some three inches in that same axial direction has proven sufficient. The extent of travel, of course, can be adjusted as required for any given application.

To protect the cutting heads against accidental bumping and possible displacement or damage during the insertion of the cruciform removal tool 18 and movement thereof throughout the length of an ice basket 10, as required, it has been found desirable to provide, as seen in FIGS. 8 and 9, protector bars 160a through 160d which may be welded to the upper plates of the clamps 84a through 84d, each thereof extending vertically upwardly a sufficient distance to protect the corresponding torches 120a–120d throughout the extent of travel thereof, in performing the cutting operation.

With reference to FIG. 2, there is illustrated schematically the connection of tubing 108 through a valve 180 to a suitable source of supply for actuation of the air cylinders 100. Likewise, there is schematically illustrated a valve 182 connected to the supply lines 122 and 124 for the torches which in turn is connected to suitable sources of gas supply. It has been found to be desirable to employ a conventional electric spark igniter for the gas torches so as to permit igniting the torches remotely, i.e., from the exterior of the ice basket 10, after the cruciform removal tool 18 is in position within the ice basket 10 and engaging a given cruciform 14 to be cut and removed. For ease of illustration, such a conventional electric spark ignition means is illustrated schematically in FIG. 2 as a switch 200 for connection to an electrcal source (not shown), interconnecting wire(s) 202 and an igniter, but the same will be understood to be associated with the assembly 34 and disposed adjacent the heads of the respective torches 120a–120d, in conventional fashion.

In operation, for effectiveness and efficiency, it has been found desirable to remove the ice in any given compartment prior to using the cruciform removal tool 18 of the present invention for cutting and removing the associated cruciform 14. Accordingly, once the ice has been removed, the cruciform removal tool 18 is lowered into the ice basket 10 by a suitable winch (not shown) until the guide and clamp assembly 24 is properly aligned with the next cruciform 14 to be removed. In this operation, valve 180 is opened to supply air pressure to the air cylinders, as shown in FIG. 6a as to air cylinder 100, thereby to retract the actuator 106 and pivot the lever 98 to an open position defining an entry throat to the channel 94 for receiving a corresponding strap 14a of the cruciform 14. When the straps are fully in position in their respective channels, valve 180 is closed and the air cylinder 100d is deactuated, whereby the actuator 106 moves to its normal position, pivoting lever 108 about the strap 14a and locking same therewithin. The torches 120a–120d then are ignited, initially at a low pressure oxygen supply, and the linear actuator 26 is energized to advance the torches downwardly until the top surfaces of the cruciform straps are being heated. After sufficient heating, typically a few seconds, the oxygen pressure is increased to a cutting level and the linear actuator 26 again is activated to advance the cutting torch assembly 34 downwardly at a pre-established rate. At the end of the predetermined travel length, the cutting operation will be completed and the linear actuator 26 will stop, as is conventional. When initially clamped by the cruciform alignment and clamping assembly 24, the cruciform 14 affords a degree of support for the entirety of the tool 18. Thus, when the cruciform 14 is cut free, the tool 18 typically will react, being displaced downwardly somewhat, as will be noted by increased tension on the supporting line from the winch (not shown). Thus, a positive indication of the completion of the cutting operation is afforded, signalling the operator to turn off the gas supply at valve 182, thus extinguishing the torches, and thereafter to withdraw the tool 18 from the ice basket 10 with the removed cruciform 14 still engaged by the assembly 24. After removal of ice from the next successive chamber, the tool 18 is inserted again and the next successive cruciform 14 is removed by repeating the foregoing procedures, throughout the extent of the ice basket 10.

It has been found preferable to employ acetylene gas, as compared to propane gas, to expedite the cutting operation. In one practical application, the acetylene supply pressure was 8.75 psi, the pre-heat oxygen was 15 psi, and the pressure of oxygen used during the cutting operation was 40 psi. In practical applications, in view of the heat generated during the cutting operations, it has been found desirable to position the air cylinders associated with the cruciform guiding and clamping assembly 24, and as shown at 100 in FIG. 6a, at a more remote position relative to the heads of the cutting torches 120a–120d. As is apparent from the view of FIG. 4 and with reference to FIG. 6a, there is ample axial space intermediate the adjacent cutting torches 120a and 120b to axially displace the air cylinder 100 from its associated clamp 84a with a suitable bracket and to provide an elongated actuator arm 104 for spanning the increased distance; however, for convenience of illustration herein, such remote positioning has not been shown. It also has been found desirable to employ high melting temperature plastic or metal hoses for supply of air, fuel and oxygen, in view of the heat generated during the cutting operation.

Those of skill in the art will appreciate that the cruciform removal tool of the present invention accomplishes in an efficient and an effective manner an otherwise laborious and time consuming task, in the repair and replacement functions essential to ice basket structures employed with nuclear reactors. It further will be apparent to those of skill in the art that numerous modifications and adaptations of the present invention may be made and accordingly it is intended by the appended claims to cover all such modifications and adaptations as fall within the true spirit and scope of the appended claims.

I claim as my invention:

1. A tool for removing cruciforms from an ice basket having an elongated, generally cylindrical and vertically oriented sidewall, the interior of which is accessible from the upper, open end thereof, each said cruciform extending horizontally within the interior of the ice basket at a position axially displaced from the open, upper end thereof and being attached at its periphery to the interior of said sidewall, comprising:

clamping means for selectively clamping a cruciform to be removed;

means for supporting said clamping means within an ice basket in association with a cruciform to be clamped thereby;

means for selectively actuating said clamping means to clamp the associated cruciform;

means for cutting the cruciform, as clamped by said clamping means, from the ice basket; and means for mounting said cutting means to said supporting means.

2. A tool as recited in claim 1, wherein:

said supporting means comprises upper and lower ends;

said clamping means is secured to said lower end of said supporting means; and said mounting means mounts said cutting means to said supporting means for movement relative thereto while cutting the clamped cruciform.

3. A tool as recited in claim 2, wherein:

said mounting means mounts said cutting means to said supporting means for relative movement with respect thereto in a direction parellel to the axis of the ice basket.

4. A tool as recited in claim 2, wherein each said cruciform comprises plural straps extending from a central portion of the cruciform in generally radial and angularly separated orientations to the cylindrical sidewall of the ice basket, and wherein:

said clamping means comprises plural, individual clamping elements, spaced apart for positioning in alignment with corresponding straps of an associated cruciform and selectively operable to clamp the respectively corresponding cruciform straps.

5. A tool as recited in claim 4, wherein said cutting means comprises plural, individual cutting elements corresponding to sid plural, individual clamping elements and disposed relatively thereto for cutting the respectively corresponding cruciform strape clamped thereby.

6. A tool as recited in claim 5, wherein:

said mounting means mounts said cutting elements to said supporting means for common, relative movement with respect thereto in a direction parallel to the axis of the ice basket while cutting the corresponding cruciform straps.

* * * * *